US012158101B1

(12) United States Patent
Al-Subaih

(10) Patent No.: US 12,158,101 B1
(45) Date of Patent: Dec. 3, 2024

(54) INTERNAL CONTINUOUS COMBUSTION ROTARY ENGINE

(71) Applicant: Adel Al-Subaih, Kaifan (KW)

(72) Inventor: Adel Al-Subaih, Kaifan (KW)

( * ) Notice: Subject to any disclaimer, the term of this patent is extended or adjusted under 35 U.S.C. 154(b) by 0 days.

(21) Appl. No.: 18/596,312

(22) Filed: Mar. 5, 2024

(51) Int. Cl.
*F02B 53/02* (2006.01)
*F01C 21/08* (2006.01)
*F02B 33/44* (2006.01)
*F02B 39/04* (2006.01)
*F02B 53/14* (2006.01)

(52) U.S. Cl.
CPC .......... *F02B 53/02* (2013.01); *F01C 21/0809* (2013.01); *F02B 39/04* (2013.01); *F02B 53/14* (2013.01); *F02B 33/44* (2013.01)

(58) Field of Classification Search
CPC .......... F02B 39/04; F02B 53/02; F02B 53/14; F02B 33/44; F01C 21/0809
See application file for complete search history.

(56) References Cited

U.S. PATENT DOCUMENTS 1,869,787 A * 8/1932 Trumble ................ F02B 39/04 123/65 VC
2007/0137595 A1* 6/2007 Greenwell .............. F01B 13/04 123/43 R
2022/0290566 A1* 9/2022 Choi ........................ F01C 21/10
2023/0407748 A1* 12/2023 Schevets ............. F01C 21/0836

FOREIGN PATENT DOCUMENTS

DE 102011012095 A1 * 8/2012 .............. F02B 21/00

* cited by examiner

*Primary Examiner* — Ngoc T Nguyen
(74) *Attorney, Agent, or Firm* — Sam Pierce

(57) ABSTRACT

This invention describes an internal continuous combustion rotary engine. It consists of a compressor with air tank storage, fuel pump with fuel pressure tank, combustion chamber with air-fuel feed rate control and spark plug, pneumatic rotary vane motor with output shaft, and mechanical means to drive the compressor from the motor. As the stored pressurized fuel and air fed into the combustion chamber with a spark to initiate combustion, which will generate pressurized combustion gases. Pressurized combustion gases will drive the pneumatic rotary motor, which will then drive the compressor and fuel pump to maintain adequate supply of pressurized air and fuel for continuous operation, and produce mechanical work. The pneumatic motor is a positive displacement, fully sealed, radial vane rotary type motor, with simple reliable inverted crank slider mechanism to drive the vanes in cyclic angular speed ratio in one direction.

4 Claims, 5 Drawing Sheets

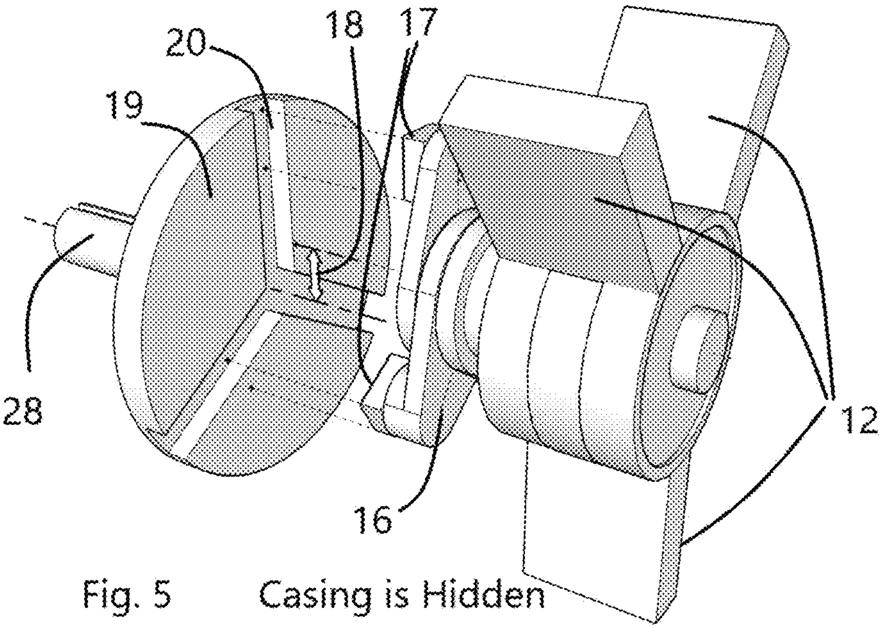
Fig. 5 Casing is Hidden
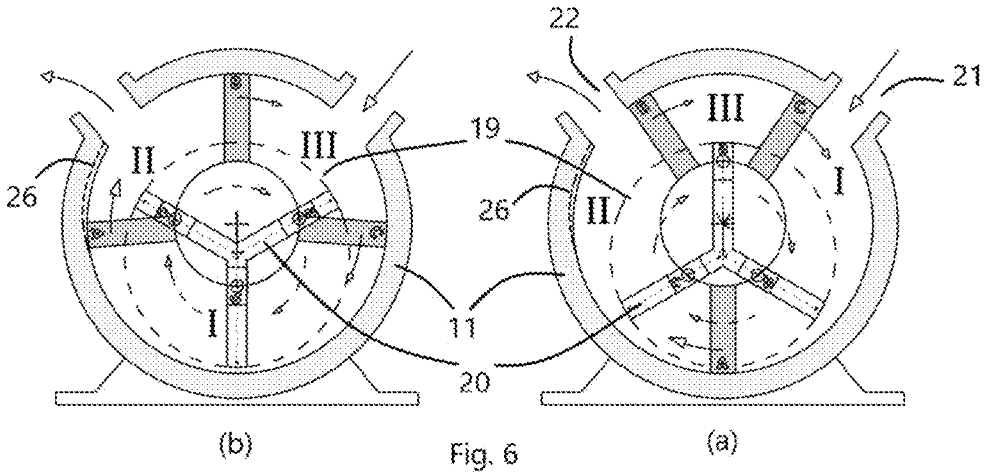
Fig. 6

INTERNAL CONTINUOUS COMBUSTION ROTARY ENGINE

BACKGROUND

Internal continuous combustion engines have been described in the prior art patent literature.

For example, U.S. Pat. No. 2,476,397, by Bary, on Jul. 19, 1949 introduced the concept of an internal continuous combustion engine (ICC engine). The invention consists of a rotary compressor, combustion chamber and rotary drive.

U.S. Pat. No. 2,688,230, by Milliken, on Sep. 7, 1954 describes an internal continuous combustion engine (ICC engine) with a reciprocating piston compressor, combustion chamber and a reciprocating piston drive with a crankshaft.

U.S. Pat. No. 3,057,157, by Close, on Oct. 9, 1962 describes an internal continuous combustion engine (ICC engine) made of a rotary vane compressor and drive combination in one casing with a combustion chamber attached.

U.S. Pat. No. 3,886,734, by Johnson, on Jun. 3, 1975 presented an internal continuous combustion engine (ICC engine) with several embodiments including reciprocating piston and rotary.

U.S. Pat. No. 3,996,899, by Partner et al., on Dec. 14, 1976 introduces an inline compressor, combustion chamber and drive in one casing. The compressor and the drive are of the lobe type.

U.S. Pat. No. 4,854,279, by Seno, on Aug. 8, 1989 is similar in some ways to U.S. Pat. No. 3,057,157, by Close, above. It describes ICC engine made of rotary vane compressor and drive combination in one casing with combustion chamber attached.

U.S. Pat. No. 5,522,356, by Palmer, on Jun. 4, 1996 presented an internal continuous combustion engine (ICC engine) which consists of a radial vane compressor and radial vane drive, both mounted on the same shaft with combustion chamber connecting between them.

U.S. Pat. No. 6,854,437, by Vazquez, on Feb. 15, 2005 disclosed embodiments based on a radial compressor and drive with combustion chamber in between.

The common feature for the above disclosures is simply a compressor supply air to a combustion chamber, which produces high-pressure combustion gases that drives a motor. The motor then drives the compressor and supplies the mechanical work. Variation is mainly in the compressor and motor design, arrangements and auxiliary equipment.

SUMMARY OF INVENTION

This invention introduces an internal continuous combustion rotary engine. Its main parts are mechanical compressor, combustion chamber and a pneumatic motor. The mechanical output of the motor drives the compressor to supply air for the combustion chamber. Other components such as air tank, fuel pump, fuel pressure tank, injectors and various controls needed to support and optimized continuous operation.

The parts are as follow:

1—compressor: a mechanical compressor, driven by the output of the pneumatic motor to produce compressed air for the combustion, which is stored in intermediary tank.

2—Combustion chamber fed by pressurized air and fuel injection, which continuously combust and generate pressurized hot gases. It has a spark plug to start the ignition.

3—Rotary pneumatic motor, which driven by the pressurized combustion gases to produces rotational mechanical motion, which partially drives the compressor and other auxiliary equipment. The motor is vane rotary type with inverted crank-slider mechanism to cyclically varying the angular velocity ratio of the vanes with respect to each other, and with respect to the output shaft.

4—Auxiliary parts, such as air tank, fuel pump, fuel pressure tank, spark plug and various controls needed for optimum operation and self-starting feature.

By having stored pressurized air and fuel, the engine can start without starter motor. It can start by merely suppling the combustion chamber with the right amount of air and fuel with a spark to ignite and produce pressurized combustion gases, which will start the engine.

The compressor driven via V-belt or any other mean of mechanical power transmission. It also can be designed to be driven by the same output shaft with the pneumatic motor for more compact design.

BRIEF DESCRIPTION OF THE DRAWINGS

FIG. 5: View of the moving parts inside the pneumatic motor, casing and covers hidden.

FIG. 6: Schematic drawing showing the vanes at different positions.

DETAILED DESCRIPTION

Figure 1:
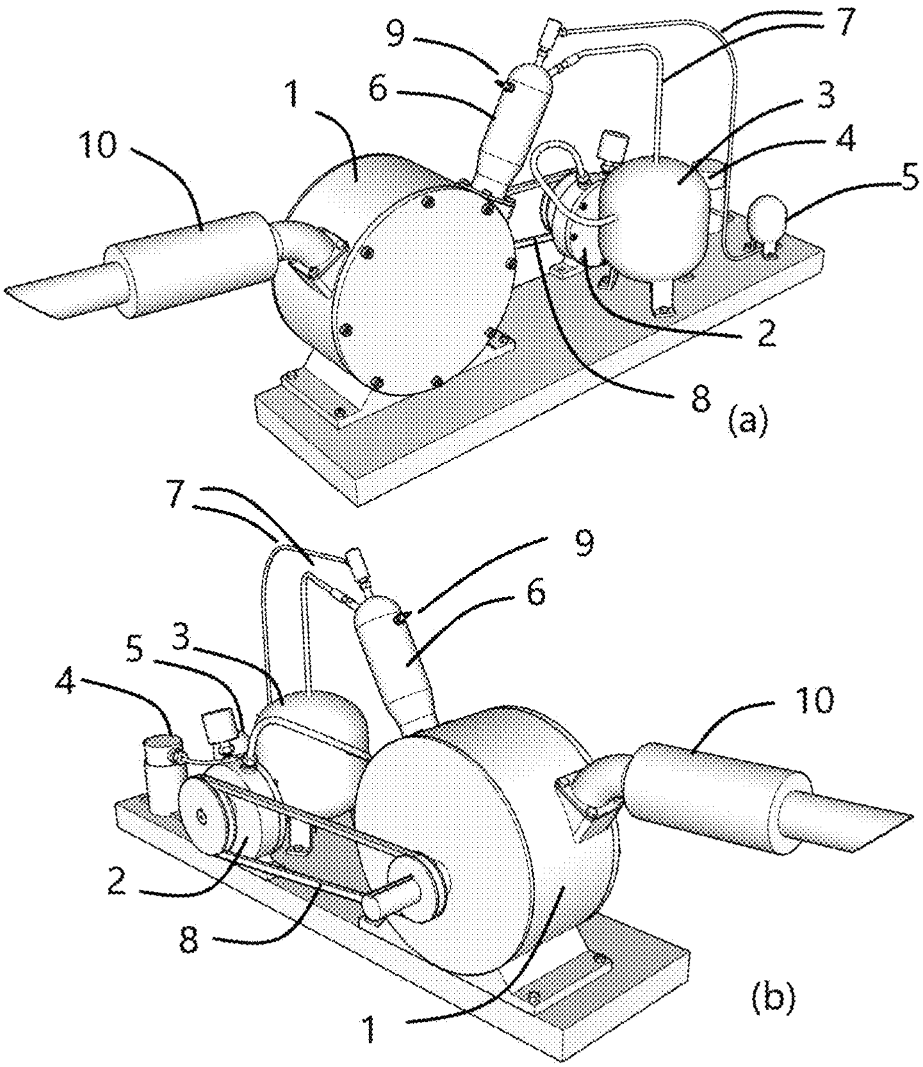
FIG. 1: General view of the engine, front and back.

The Internal combustion engines can be divided into two categories:

1—Continues combustion engine, where the combustion take place in a continues manner by steady flow of pressurized fuel and air in a combustion chamber, which generate pressurized combustion gases which drives a motor, such as gas turbine. The engine then drive the compressor to supply air for the continuous combustion. The best-known example is the gas turbine, which is based on axial flow turbine compressor and motor. Several inventions in prior art suggested the same but with various types of mechanical compressors and motors other than axial flow turbines.

2—Intermittent combustion engine where a specific amount of air and fuel mixture ignited in a close chamber producing high-pressure gases, which drives the engine which may be reciprocating piston or rotary type, Such as conventional gasoline and diesel engine.

This invention introduces an internal continuous combustion rotary engine. Its main parts are mechanical compressor, combustion chamber and a pneumatic motor. The mechanical output of the motor drives the compressor to supply air for the combustion chamber. Other components such as air tank, fuel pump, fuel pressure tank, injectors and various controls needed to support and optimized continuous operation.

The concept is similar to the gas turbine engine. Gas turbine main components are simply, axial flow blade compressor, combustion chamber and axial flow blade turbine. The turbine drives the compressor and supply the mechanical output.

This invention is similar by the way of replacing the axial flow blade compressor by a mechanical compressor and the axial flow blade turbine by a pneumatic motor with some auxiliary components and refinements.

In this invention, the novelty is in 1) the intermediate tanks for pressurized air and fuel storage which will allow for a quick kick start without the need for starter motor, the ability of control and optimization the air fuel mixture, excess air released into the motor, after combustion to recover energy. And 2) the pneumatic motor design which is a positive displacement, fully sealed, radial vane rotary type motor, with simple reliable inverted crank slider mechanism to drive the vanes in cyclic speed ratio in one direction.

This engine is more efficient for the following reasons:

1. Casing is cylindrical, unlike most of the rotary engines that have a casing not perfectly circular.
2. It is a dynamic positive displacement. Dynamic effect of a jet turbine and positive displacement like a conventional internal combustion engine.
3. Utilizes all spectrum of pressures, even low pressures, contrary to the minimum pressure required by a turbine engine.
4. No reciprocating motion that wastes energy in changing directions (momentum, impetus, inertia).
5. Does not waste energy in cycles, as in four and two stroke engines, conventional or rotary.
6. Does not waste power on typical components in conventional engines, such as, camshafts, valves, springs and crankshaft.
7. It can start without a starter motor.
8. It can use many types of fuels gas or liquid.

This engine is more durable for the following reasons:

1. Simple design, less moving parts, smaller and lighter.
2. Rotation only in one direction avoids wear caused by reversing direction.
3. Less vibration.
4. Can utilize new materials such as advanced ceramics that withstand high temperature for the casing and the vanes.
5. It can be designed to run without oil in the high temperature zone such as the casing and vanes. This is because of the perfectly circular cylinder casing with perfectly centered vanes, using small clearance between the vanes end and the casing achieving labyrinth seal effect.

This engine is easier and cheaper to manufacture for the following reasons:

1. All components made using basic workshop machine tools.
2. Fewer parts.
3. Simple assembly.
4. Easy to manufacture, hence, less expensive to make.

General operation description.

The invention is an internal continuous combustion engine, FIG. 1 a and b, which consists of pneumatic motor 1, air compressor 2, air tank 3, fuel pump 4, fuel pressure tank 5, combustion chamber 6 and related piping 7 and auxiliary components and controls.

The compressor 2 driven by the pneumatic motor 1 via V belt 8 or direct or by any other mechanical power transmission means. Pressurized air is stored in the air tank 3. The compressor 2 produces sufficient air to meet the top operation load. To avoid oversupply of air, the compressor 2, may be controlled by a clutch or bypass valve (not shown) or the surplus air is released into the combustion chamber 6 after combustion for energy recovery.

The fuel pump 4 can be electric or mechanical to pressurize the liquid fuel into a bladder type pressure tank 5 or equivalent to have the fuel ready for combustion with the right pressure. No need for the fuel pump 4 and tank 5 if a liquefied gas fuel used with gas pressure greater than the combustion chamber 6 rated pressure at its top load.

With proper control and safety, at minimum quantities, the air and fuel released into the combustion chamber 6 with spark from the spark plug 9 to initiate ignition for continuous combustion. The combustion will release high-pressure hot gases. The pressurized combustion gases will positively drive the pneumatic motor 1, which in turn will drive all auxiliary equipment and produce a mechanical work. Combustion gases then exit from the muffler 10.

Figure 2:
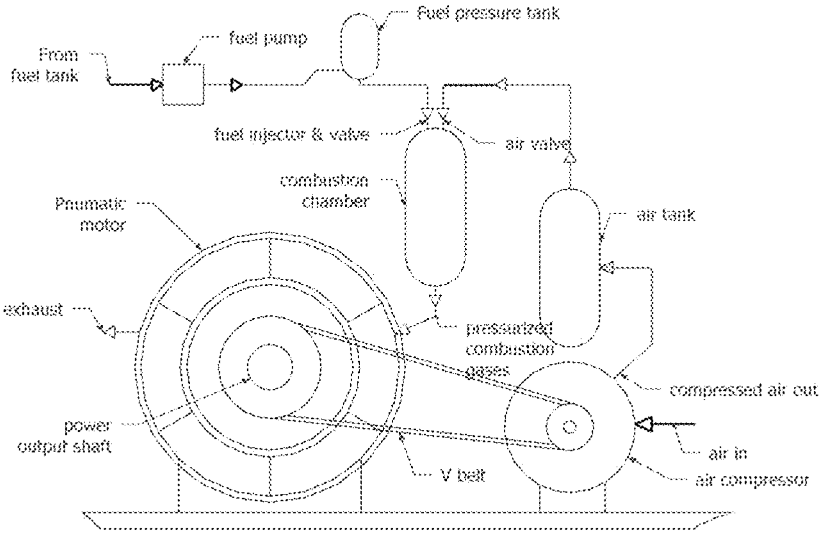
FIG. 2: Schematic diagram showing the process.

FIG. 2 shows a schematic diagram of the process as described above.

Pneumatic motor description.

Figure 3:
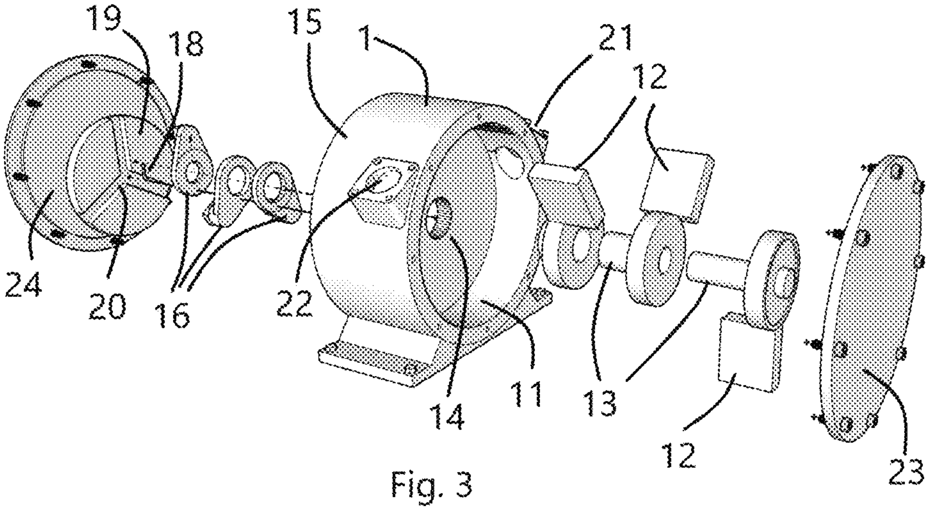
FIG. 3: Assembly view of the pneumatic motor with three vanes.
Figure 4:
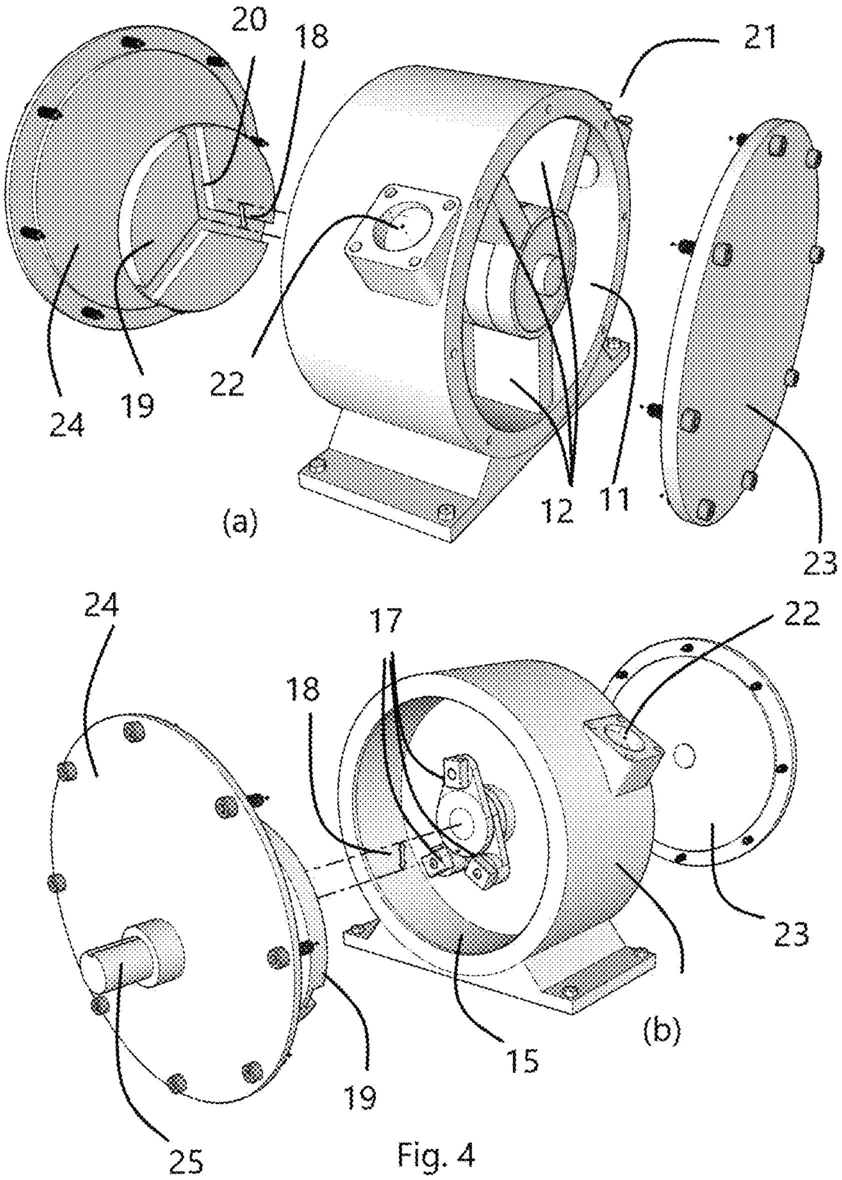
FIG. 4: Opened pneumatic motor with three vanes.

The pneumatic motor 1 in FIGS. 3, 4, 5 consists of a cylindrical casing 11 with three vanes 12; each vane has a shaft 13 coaxial with the others, out through the casing center 14 into the crank-slider mechanism casing 15 on the back. Each vane 12 has a crank 16 on the other side in the crank-slider casing 15, mounted in the opposite direction to the vane 12 for balancing purposes with a pivoted slider block 17. The three vanes are linked and driven by an offset 18 flywheel plate 19 with three slider ways 20 that makes 120 degree between them. Each of the three crank-slider mechanisms will operate such that it will have cyclically varying angular velocity ratio with respect to the flywheel, varying from above 1 to below 1, by amount depending on the offset 18 with respect to the crank arm length 16. In another words, the three vanes 12 angular velocity linked together so that their angular velocity depends on their location in the casing. FIG. 6(*a*), shows a position where vanes B and C are at equal slower angular speed while the vane A is faster. In this case, with the pressurized combustion gases entering the casing at 21, vane A become the driving vane, making zone I expand while rotating in the clockwise (CW) direction and vanes B and C are driven slower in CW direction. Zone II is in exhaust mode out of 22, while zone III idle. As the flywheel rotate further 60 degrees, FIG. 6 (*b*), vane C will advance and become the driving vane and vane B will be at its minimum speed ratio, so that zone III will be expanding while rotating in the CW direction, zone I about to exhaust, while zone II already exhausted.

Figure 7:
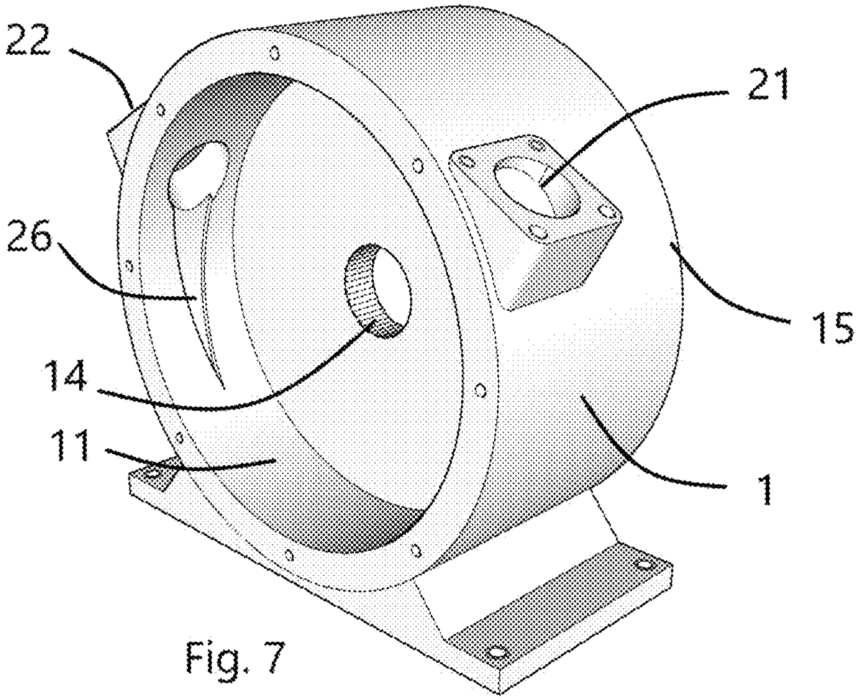
FIG. 7: Casing view showing discharge slot for gradual exhaust of pressurized gases.

FIG. 6 (*b*) shows the position after vane C became the driving vane, which make the active zone is Ill, hence the zone II is pressurized and idle and about to exhaust. This will allow for gradual release of pressurized gases via extended internal slot 26, FIG. 7. This will make the engine run quitter and avoid the need of big muffler, if any.

It is worth mentioning that the pneumatic motor described above can operate with only two vanes, however, this will have several problematic situations, such as:

Lock position where angular velocity ratio of both vanes are equal.

Flow through positon where the inlet and exhaust are open through without vane between them to harvest mechanical work.

If the above case avoided by widening the ends of the vanes or narrowing the inlet and exhaust to instantaneously block the inlet and exhaust while shifting, this will create the possibility of blocked case which likely to cause explosion.

In short, two vanes will work; however, there are situations that can be problematic or fatal.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description.

Other embodiments may be utilized and derived from the present invention, such that structural and logical substitutions and changes may be made without departing from the scope of this disclosure.

Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. An internal continuous combustion engine, comprising:

an air compressor;

an air tank;

a fuel pressure tank;

a fuel pump;

one or more fuel injectors;

one or more air valves;

a combustion chamber;

a pneumatic motor; and a controller, wherein the pneumatic motor is a positive displacement, fully-sealed radial vane rotary type motor.

2. The internal continuous combustion engine of claim 1, wherein the pneumatic motor comprises a cylindrical casing with two or more vanes with a coaxial shaft that are driven by an offset slider-crank mechanism by slots in a flywheel and drives the vanes in cyclic angular velocity ratio with respect to each other so that the chambers within the power range are expanding while rotating in one direction so the combustion gas pressure drives the motor by expanding the power range chambers.

3. The internal continuous combustion engine of claim 1, further comprising a slot on the inner casing wall for release of pressurized gases near the exhaust port, wherein the slot is cut so that it increases in width and/or in depth in the direction toward the exhaust port and so that it extends the pressurized gas release time as the vane passes over it.

4. The internal continuous combustion engine of claim 1, wherein the air tank and fuel pressure tanks are for holding pressurized air and fuel ready for kick-start without the need for a starter motor.

* * * * *